(12) United States Patent
Dubouloz et al.

(10) Patent No.: US 8,238,408 B2
(45) Date of Patent: Aug. 7, 2012

(54) METHOD FOR PROCESSING A SAMPLED RECTIFIED ULTRA WIDE BAND SIGNAL

(75) Inventors: Samuel Dubouloz, Seyssins (FR);
Sebastien De Rivaz, Montmelian (FR);
Mathieu Sambuq, Tournefeuille (FR)

(73) Assignee: Commissariat a l'Energie Atomique, Paris (FR)

( * ) Notice: Subject to any disclaimer, the term of this patent is extended or adjusted under 35 U.S.C. 154(b) by 336 days.

(21) Appl. No.: 12/598,986

(22) PCT Filed: May 11, 2007

(86) PCT No.: PCT/FR2007/051255
§ 371 (c)(1),
(2), (4) Date: Feb. 23, 2010

(87) PCT Pub. No.: WO2008/139044
PCT Pub. Date: Nov. 20, 2008

(65) Prior Publication Data
US 2010/0142647 A1    Jun. 10, 2010

(51) Int. Cl.
*H04B 1/00* (2006.01)
(52) U.S. Cl. .................................. 375/142; 375/343
(58) Field of Classification Search .......... 375/142–143, 375/152, 343
See application file for complete search history.

(56) References Cited

U.S. PATENT DOCUMENTS 7,142,584 B1 * 11/2006 Bomer et al. ................. 375/145
7,362,743 B2    4/2008 Miscopein et al.
2003/0232612 A1 * 12/2003 Richards et al. ............. 455/323
2005/0058210 A1    3/2005 Berger et al.
2006/0104337 A1 * 5/2006 Johnson et al. ............. 375/149

FOREIGN PATENT DOCUMENTS

| EP | 1 465 354 | 10/2004 |
| FR | 2 848 746 | 6/2004 |
| WO | WO 2005/101666 | 10/2005 |

OTHER PUBLICATIONS

FCC, "First Report and Order," FCC 02-48, Feb. 14, 2002, pp. 1-118.
M.Z. Win and R.A. Scholtz, "Impulse Radio: How it Works," IEEE Comm. Letters, vol. 2, No. 2, pp. 36-38, Feb. 1998.
"D2p802-15-4A Draft Standard," IEEE 802.15.4a drafting document, Oct. 1, 2003, pp. 1-670.
L. Stoica, A. Rabbachin, I. Oppermann, "A Low-Complexity Noncoherent IR-UWB Transceiver Architecture with TOA Estimation," IEEE Transactions on Microwave Theory and Techniques, vol. 54, No. 4, Apr. 2006, pp. 1637-1646.

(Continued)

*Primary Examiner* — Emmanuel Bayard
(74) *Attorney, Agent, or Firm* — Oblon, Spivak, McClelland, Maier & Neustadt, L.L.P.

(57) ABSTRACT

A method for processing, in an ultra-wide band receiver, a sampled rectified ultra-wide band received signal, including: at least one sliding correlation between a selection of samples of the sampled ultra-wide band received signal and a correlation sequence, the sliding correlation carrying out a succession of n elementary correlation steps, n being an integer larger than or equal to 2, at a frequency f, between the selection of samples and the correlation sequence, an elementary correlation producing a series of intermediate correlation samples, and summation of the intermediate correlation samples delivered by each of the n elementary correlation steps to form n correlation samples which form a correlation vector.

22 Claims, 12 Drawing Sheets

OTHER PUBLICATIONS

Sung-Yoon Jung, Dong-Jo Park, "Design of Preamble Signal for Synchronization with UWB Non-Coherent Energy Detection Receiver," Ultra Wideband 2005 ICU 2005, Sep. 5-8, 2005 IEEE International Conference, pp. 464-468.

A. Rabbachin, I. Oppermann, "Synchronization Analysis for UWB Systems with a Low Complexity Energy Collection Receiver," Ultra Wideband Systems 2004 Joint Conference, Ultra Wideband Systems Technologies Joint UWBST, IWUWBS 2004 International Workshop, pp. 288-292.

* cited by examiner

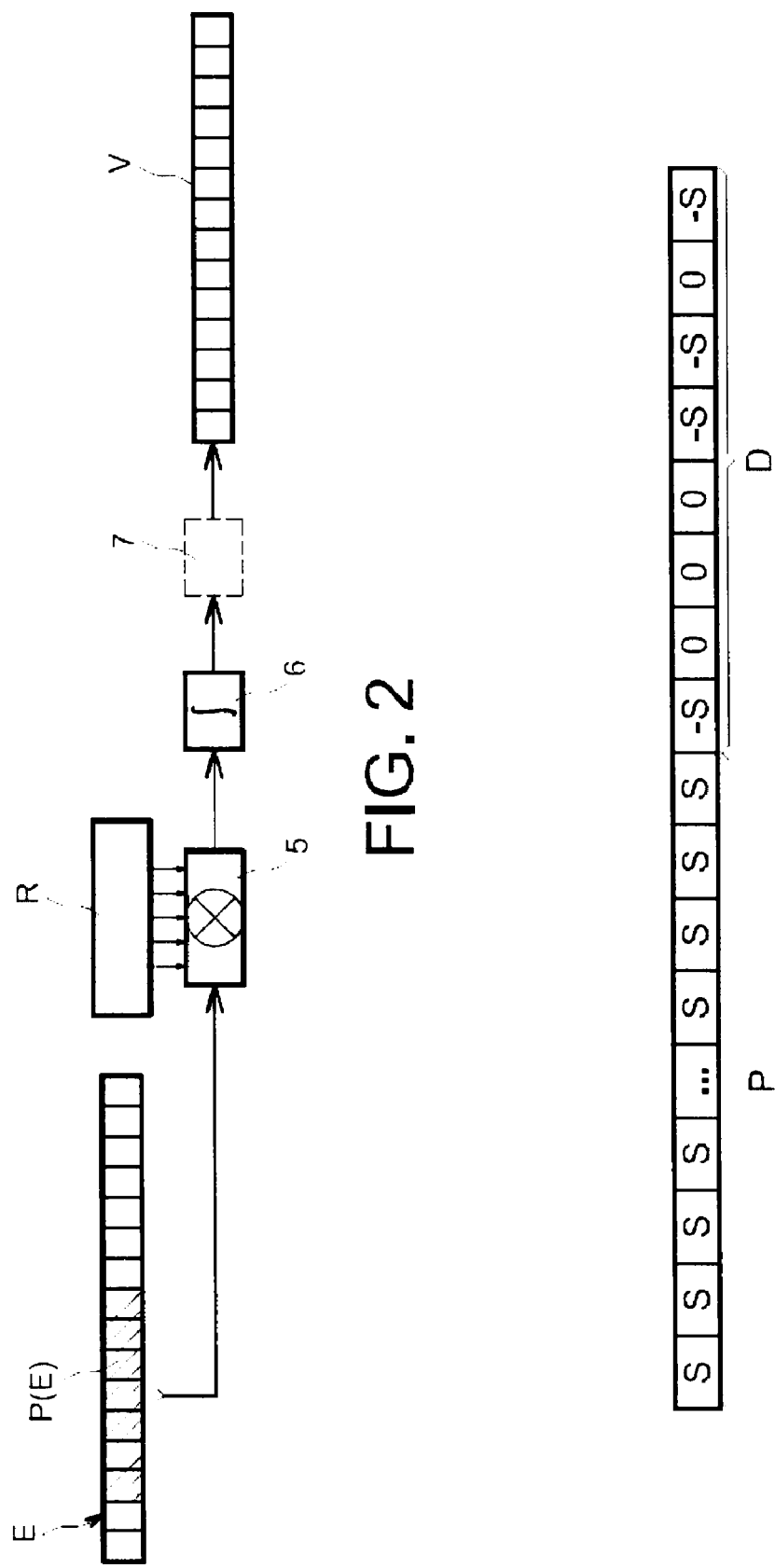

METHOD FOR PROCESSING A SAMPLED RECTIFIED ULTRA WIDE BAND SIGNAL

TECHNICAL FIELD AND PRIOR ART

The present invention relates to a method for processing a sampled rectified ultra-wide band signal.

The method of the invention is applied in the field of wireless digital communications based or <<UWB>> techniques, i.e. using signals, the ratio of which between the bandwidth at 10 dB and the central frequency is larger than 25% (cf. bibliographical reference [1]).

The method of the invention more particularly relates to the problem of detecting ultra-wide band pulsed signals. The method of the invention contributes to the definition of a new detection technique which promotes integration of detection circuits into a single integrated circuit. An object of the invention is to provide a performing reception architecture with low complexity.

The invention relates to the field of data transmission. Data transmission may be accomplished both in air (radiofrequency waves) or over an electric or optical medium.

The applications of the method of the invention are of the private network type and of the low throughput wireless local network type, i.e.: communicating labels, sensor arrays, adhoc networks (i.e. capable of self-organizing without any infrastructure established before hand), object localization, safety, etc.

In ultra-wide band communications systems, the data transmitted between a transmitter and a receiver are amplitude-coded, phase-coded, or position-coded electromagnetic pulses [cf. bibliographic reference [2]). A critical step of the communication process between the transmitter and the receiver is located at the reception of the data packets, in order to determine the instants at which these data packets arrive at the receiver. Synchronization between the received signal and the receiver is then necessary. This synchronization is all the more difficult to achieve since the medium in which the communication is carried out is perturbed (occurrence of multiple paths).

The IEEE 802.15.4a standard [cf. bibliographical reference [3]), which proposes a physical layer of the ultra-wide band type for low throughput wireless private networks imposes new constraints in terms of circuit complexity. Further, it proposes the use of data packets having a relatively long duration, associated with particularly strong constraints on the defects of clocks. These two combined aspects imply that robust methods should be achieved for detecting and correcting clock defects.

Presently there are many solutions with which synchronization of a receiver on a data packet may be carried out. A frequently used technique consists of correlating the received signal with a wave form at different instants (cf. patent applications WO 1996-041432, WO 2001-073712, WO 2001-093442, WO 2001-093444, WO 2001-093446, US 2005-0089083 and US 2006-0018369). The proposed architectures allow very fast synchronization but however at the price of very high circuit complexity (the radiofrequency components used are mixers, integrators, local oscillators, etc.).

Energy detection architectures [cf. bibliographical reference [4]) are today an interesting alternative to the circuits mentioned above since their application is relatively simplified. However, in a perspective of low circuit complexity, the synchronization methods stated earlier are then no longer applicable and it is preferable to use digital architectures.

Patent EP 1 465 354 discloses the principle of the multiplication of a non-rectified sample received signal with a correlation sequence. The received signal is divided into successive signal sections and multiplications are carried out between the successive signal sections and the coefficients obtained from the correlation sequence. The results of the multiplications are then added in a summing circuit which delivers a vector of correlation samples, the duration of which is that of a received signal section. This technique has the disadvantage of being strongly influenced by clock drifts.

The method of the invention does not have the drawbacks of the different techniques of the prior art as mentioned above.

DISCUSSION OF THE INVENTION

Indeed, the invention relates to a processing method according to claim 1.

The method of the invention is thus a method for processing in an ultra-wide band receiver, a rectified received signal, sampled at a frequency of $f_E$, characterized in that it comprises:

at least one sliding correlation between a selection of the sampled rectified received signal and a correlation sequence, the correlation sequence consisting of at least one elementary correlation sequence of duration $T_S$ equal to the duration of a sequence S of a transmitted signal which corresponds to the received signal and consisting of data following each other at a frequency $f_C$ such that $f_C = f_E/k$, k being an integer larger than or equal to 1, an elementary correlation sequence datum corresponding to a datum of a transmission code used for forming the sequence S and having a spreading duration comprised between $1/f_E$ and $1/f_C$, the sliding correlation consisting of carrying out a succession of n elementary correlation steps, n being an integer larger than or equal to 2, at a frequency f less than or equal to $f_E$ and larger than or equal to $f_C$, the method comprising, for each selection of the received signal:

an elementary correlation step consisting of carrying out a correlation operation between the relevant selection of the sampled rectified ultra-wide band received signal and the correlation sequence, in order to provide a sequence of intermediate correlation samples, and summation of the provided intermediate correlation samples in order to obtain a single elementary correlation sample, the n elementary correlation samples obtained forming a first correlation vector.

Other features of the method of the invention are mentioned in the dependent claims 2 to 22.

In the following of the description, reference is often made, for the sake of simplifying the discussion, to samples or data having a duration or a frequency. However, it is known to one skilled in the art, that a digital sample or datum do not have per se any duration or frequency. One skilled in the art will understand that, when one speaks of duration/frequency of a sample or of a datum, allusions are made to a sampling duration (by extension to a sampling frequency) of the sample or to a duration of a portion of a signal (for example of a correlation) when one speaks of a signal consisting of a sequence of data.

SHORT DESCRIPTION OF THE FIGURES

The characteristics and advantages of the invention are described below with reference to the appended figures, wherein:

FIG. 2 illustrates a block diagram of the method of the invention;

FIG. 3 illustrates an exemplary preamble of an ultra-wide band signal data packet used within the scope of the invention;

DETAILED DESCRIPTION OF EMBODIMENTS OF THE INVENTION

An object of the invention is to provide a robust solution of low complexity for detecting data frames to non-coherent reception architectures for ultra-wide band signals.

Figure 1:
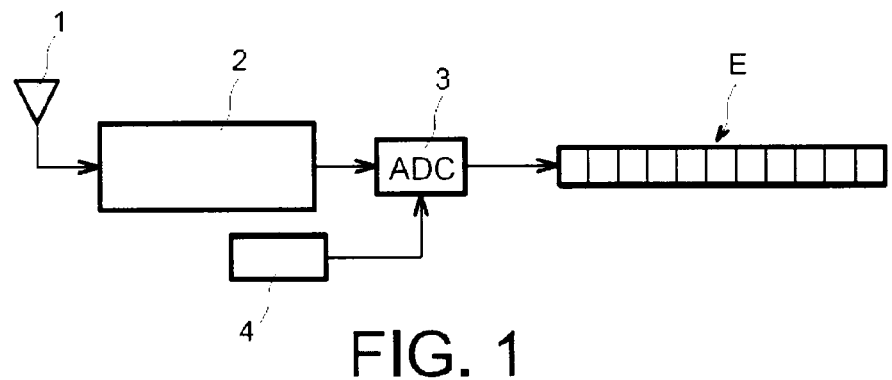
FIG. 1 illustrates a block diagram of an ultra-wide band receiver affected by the method of the invention.
Figure 4:
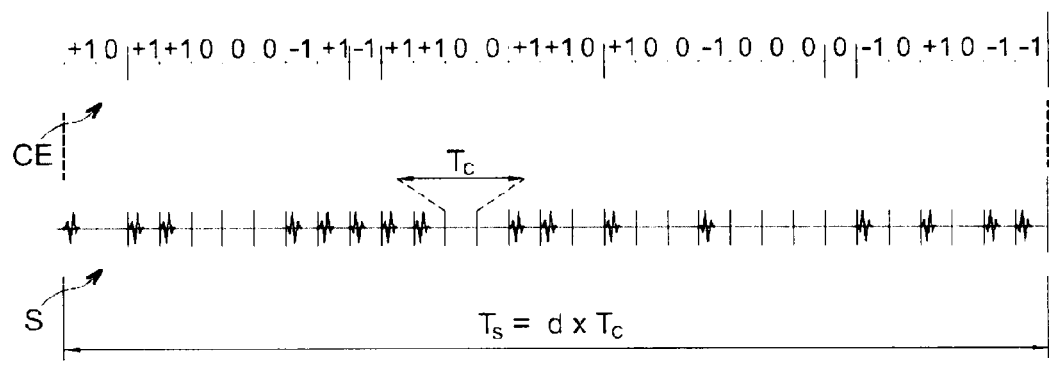
FIG. 4 illustrates an exemplary sequence S of an ultra-wide band signal data packet preamble used within the scope of the invention associated with the transmission amplitude code which corresponds to it.

FIG. 1 illustrates a block diagram of a receiver affected by the method of the invention.

The receiver of FIG. 1 comprises a receiving antenna 1, a non-coherent receiver (of the energy detecting type) 2, an analog/digital converter (ADC) 3, and a clock 4. Under the action of the clock signal delivered by the clock 4, the analog/digital converter 3 samples the ultra-wide band signal delivered by the receiver 2 at a frequency $f_E$ and delivers a signal E consisting of samples of frequency $f_E$ quantified on p levels.

FIG. 2 illustrates a block diagram of the method of the invention. A digital correlator 5 carries out a sliding digital correlation at frequency f between a correlation sequence R and a portion P(E) of the sampled signal E delivered by the analog/digital converter 3. The correlation sequence consists of a series of digital values. The portion P(E) is selected from a set synchronization-search instant. The duration of the portion P(E) is equal to the duration of the correlation sequence R and the number of samples of a portion P(E) is equal to the number of digital values making up the correlation sequence.

Carrying out a sliding correlation at frequency f between portions P(E) of the received signal and the correlation sequence R consists of selecting at frequency f successive portions of the signal P(E) and of producing a succession of elementary correlations between each thereby selected portion P(E) and the sequence R. The digital correlator 5 provides after each elementary correlation, a series of correlation samples. An integration device 6, placed at the output of the digital correlator 5, carries out after each elementary correlation, the summation of the correlation samples which result from the relevant elementary correlation. With the sliding correlation method of the invention, it is possible to obtain a correlation vector V, the components of which each corresponds to an integration result provided by the integration device 6 for a given elementary correlation.

According to an alternative of the invention, a device 7 for selecting by threshold is present at the output of the integrator 6. The device 7 for selecting by threshold has the function of selecting, in the signal delivered by the integrator, only the results for which the value is above a predetermined threshold.

Unlike the method disclosed in patent application EP 1 465 354 A1 of the prior art mentioned earlier, the method of the invention produces the sum, after correlation, of the totality of the correlation samples. Patent application EP 1 465 354 actually proposes a partial sum at the output of the correlation operation. Both correlation methods are therefore distinguished significantly at the summations carried out at the output of the correlation operation. Whereas the method discussed in patent EP 1 465 354 results in a vector of samples at the output of the summation operator, the duration of which corresponds to the duration of a section of the received signal, the method of the invention advantageously delivers a single value and the correlation vector is obtained by repeating the correlation process by shifting, at frequency f, the portion of samples of the ultra-wide band signal to be correlated. Moreover, within the scope of the invention, the samples are rectified and it is thus possible to constructively collect the totality of the received energy, which the method disclosed in patent EP 1 465 354 does not allow, since the latter uses signed samples, i.e. non-rectified samples.

Within the scope of ultra-wide band pulse transmission, the data are represented by pulses separated in time. In order to allow detection of the arrival instant of the signal containing the binary data, a preamble is added at the beginning of a data frame. This preamble is intended for the synchronization between the receiver and the received signal.

Figure 14:
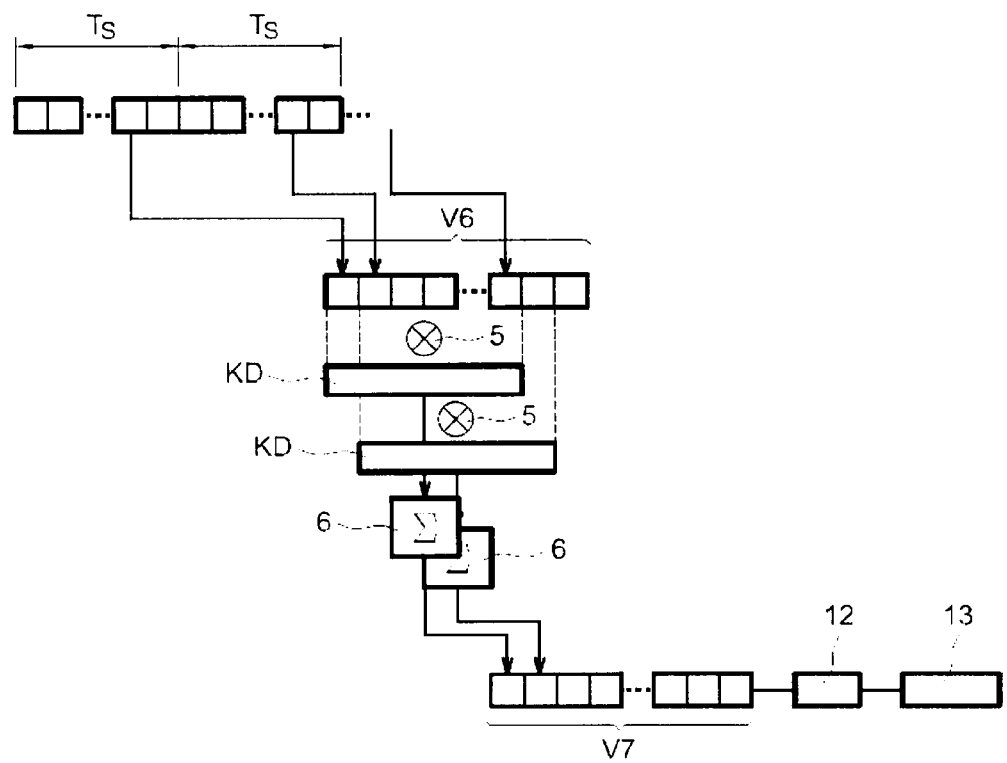
FIG. 14 illustrates a fifth exemplary embodiment of the method of the invention.

An exemplary preamble is given in FIG. 3. The preamble contains two portions: a synchronization sequence P intended for synchronization between the receiver and the received signal and a sequence for delimiting the beginning of a frame D, commonly called a <<start frame delimiter>>, which indicates the arrival instant of the first data symbol. The synchronization portion P of the preamble consists in a repetition of sequences commonly called "sequences S". Each sequence S is built from a transmission code at frequency $f_c$ ($f_c=1/T_c$). FIG. 14 shows an exemplary sequence S and the transmission code CE which corresponds to it.

The sequence S has a duration $T_S$ and comprises a succession of coded pulses, or coded words, of duration $T_C$ ($T_S=d\times T_C$, d being an integer larger than 1). The $f_C$ frequency transmission code is a code with three states: +1, 0, −1. To the state <<+1>> corresponds the transmission of a pulse train beginning with a pulse of positive amplitude within a duration $T_C$, to the state <<0>> corresponds an absence of transmitted pulse within a duration $T_C$ and to the state <<1>> corresponds the transmission of a pulse train beginning with a pulse of negative amplitude within a duration $T_C$.

A correlation sequence R of the invention is built from the sequence S which has been transmitted and therefore from the transmission code associated with the transmitted sequence S.

A $f_C$ frequency reception binary code is associated with the $f_C$ frequency transmission ternary code CE. In a first alternative of the invention, both states of the reception binary code are the states <<+1>> and <<0>>, the state <<+1>> of the reception code being associated with the states <<+1>> and <<−1>> of the transmission code. In a second alternative of the invention, both states of the reception binary code are the states <<+1>> and <<−1>>, the state <<+1>> of the reception code being associated with the states <<+1>> and <<1>> of the transmission code.

A reception code for which the binary values are +1 and 0 leads to the formation of a sequence R with non-zero average, which generates a DC component which may be detrimental to decision-making (rough synchronization, fine synchronization, estimation of the channel, etc.). The binary code for which the values are +1 or −1, a so-called centered binary code, does not have this drawback.

Figure 5A:
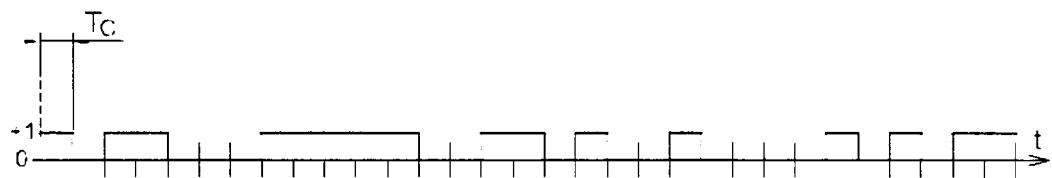
FIGS. 5A-5C illustrate three exemplary correlation sequences according to the invention.
Figure 5B:
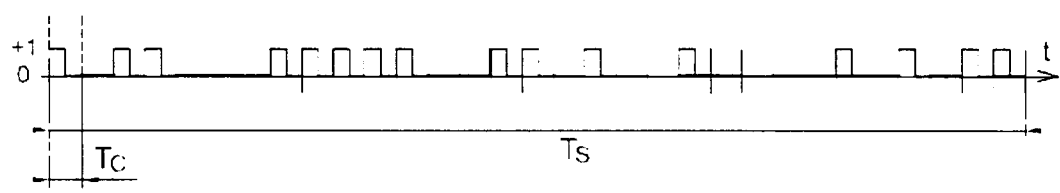
Figure 5C:

FIGS. 5A and 5B illustrate two exemplary sequences R for which the two states of the reception binary code are the states <<+1>> and <<0>> and FIG. 5C illustrates an exemplary sequence R for which the two states of the reception binary code are <<+1>> and <<−1>>.

In the example of FIG. 5A, the binary value 1 lasts for the whole duration $T_c$ whereas, in the example of FIG. 5B, the duration of the binary value 1 is $T_C/2$. More generally, the sampling frequency $f_E$ is such that:

$f_E = K \times f_C$, wherein K is an integer larger than or equal to 1, the value 1 may be taken per duration step $T_C/K$, between a minimum duration $T_C/K$ and a maximum duration $T_C$.

In the example of FIG. 5C, the binary values +1 or −1 assumed by the sequence R have a duration equal to $T_C/2$. Also, as above, more generally, the binary values +1 or −1 which the sequence R may assume are taken per duration steps $T_C/K$, between a minimum duration $T_C/K$ and a maximum duration $T_C$.

Figure 6A:
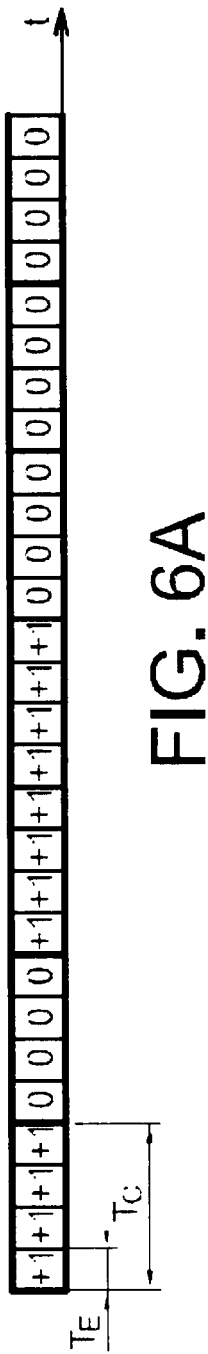
FIGS. 6A-6C illustrate binary amplitude reception codes used for forming the correlation sequences illustrated in FIGS. 5A-5C, respectively.
Figure 6B:
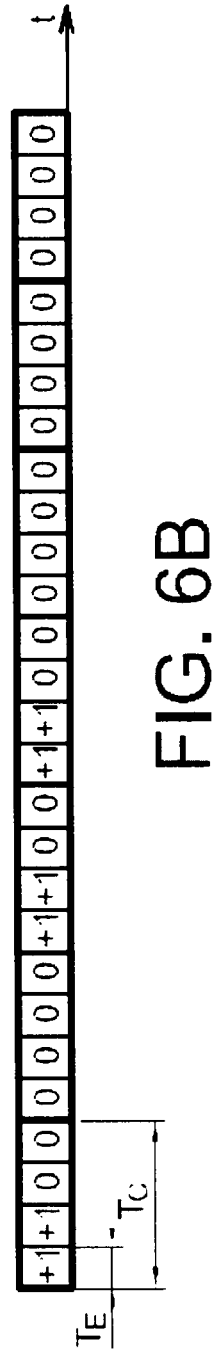
Figure 6C:
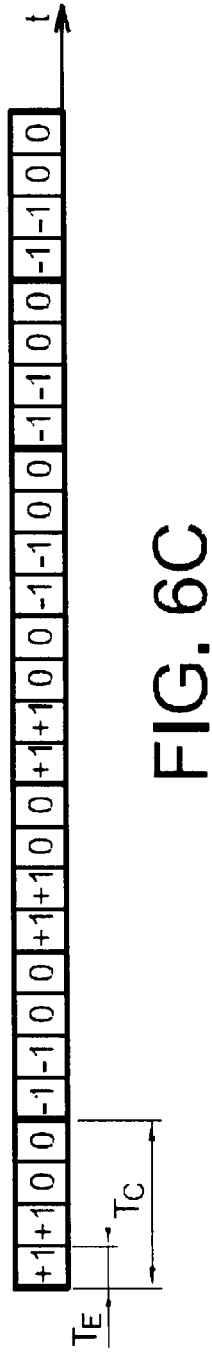

FIGS. 6A-6C symbolically illustrate as binary data, the correlation sequences R illustrated in FIGS. 5A-5C, respectively.

The modulation of the duration of the binary data which make up the correlation sequence R forms extendable low pass digital filtering, the cut-off frequency of which may be varied from $1/T_C$ to $K/T_C$. As this will be specified in the examples below, it is then advantageously possible to use a low cut-off frequency for the approximate synchronization and a higher cut-off frequency, or even the highest cut-off frequency for fine synchronization.

An advantage which results from the use of a binary signal is the reduction in complexity at the base band circuit. Indeed, the correlation process only consists in addition of numerical samples. Multiplication consists of cancelling the samples corresponding to areas where the correlation signal is zero, and integration consists of adding the non-zero samples after multiplication.

The duration of the correlation sequence R by default corresponds to the duration $T_S$ of the sequence S. This duration may however be increased in order to become an integer multiple of the duration of the sequence S ($T_R = k \times T_S$, wherein k is an integer larger than or equal to 1). The correlation sequence R then consists of a succession of elementary correlation sequences of duration $T_S$, each elementary correlation sequence of duration $T_S$ being determined as this was mentioned earlier. Increasing the duration of the sequence R has the advantage of increasing the correlation, which may be particularly useful in order to increase the processing gain or when the analog/digital converter of the receiver (cf. FIG. 1) has a low sampling frequency and/or quantification on not very many levels.

As this will now be detailed in the following of the description, with the base band architecture illustrated in FIG. 2, it is possible to carry out both time synchronization and frequency synchronization. Time synchronisation is carried out in two steps. A first step consists of rather rough synchronization on the sequence S, with time granularity corresponding to the duration $T_c$. Once this process is carried out, a second step consists of accurate alignment on the sequence S, with time granularity corresponding to the sampling period ($1/f_E$) of the signal at the input of the synchronization circuit. With frequency synchronization it is possible to determine the possible defects of clocks.

Figure 7:
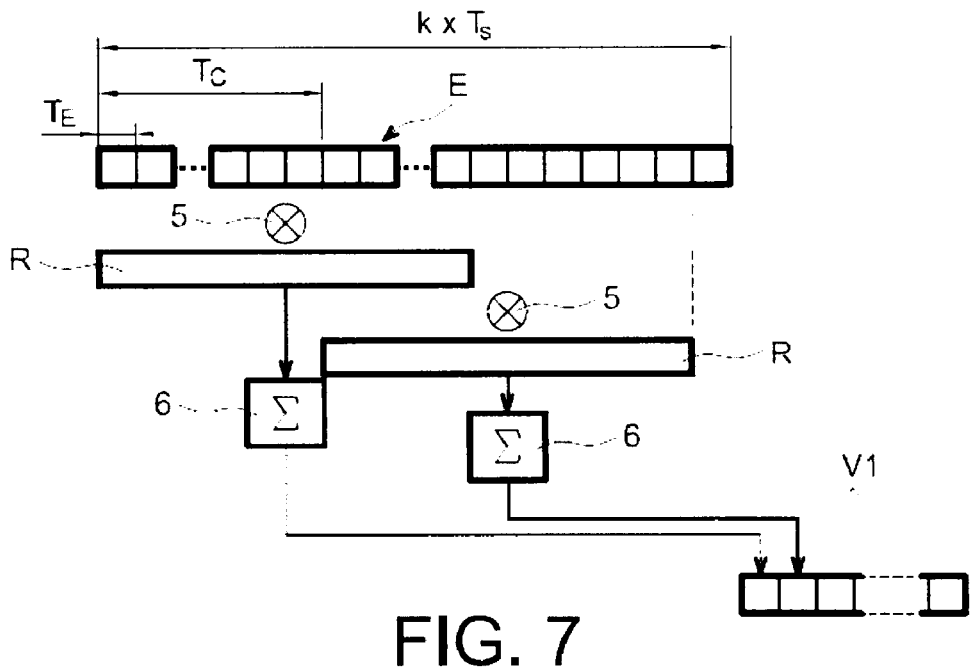
FIG. 7 illustrates a first exemplary embodiment of the method of the invention.
Figure 8:
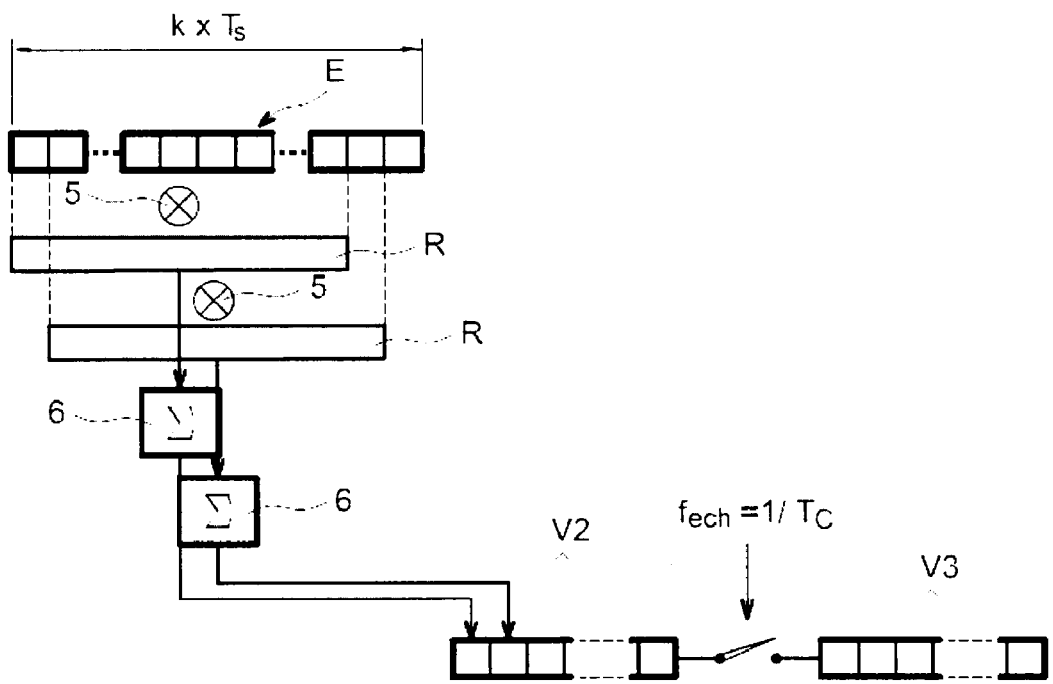
FIG. 8 illustrates a second exemplary embodiment of the method of the invention.

The first step of time synchronization consists of roughly determining the arrival instant of a sequence S from the sliding correlation between a portion P(E) of the received samples and the correlation sequence R. FIGS. 7 and 8 illustrate two examples of this first step. In the case of the first example illustrated in FIG. 7, correlation is carried out with a period equal to $T_c$ ($f=1/T_c$). In the case of the second example illustrated in FIG. 8, the correlation is carried out with a period equal to $T_E$ ($f=1/T_E$). These examples are two extreme situations between which the correlation frequency f may assume any possible intermediate value. Also, the correlation sequence R may be built according to any of the forms mentioned earlier with reference to FIGS. 5A-5C. However, according to the preferential embodiment of the invention, $T_C$ spreading low pass filtering will be used for forming the sequence R and a correlation frequency equal to $f_C$, in order to achieve rough synchronization.

In both cases described above, the samples obtained after each correlation are summed (adders 7). In the first case, (FIG. 7), the results of the successive summations form the components of a correlation vector V1. In the second case (FIG. 8), the results of the successive summations form the components of a correlation vector V2, which, sampled at a sampling frequency $1/T_C$, form a sampled correlation vector V3.

Rough synchronization of the received signal is acquired when at least two selective samples of the correlation vector V1 (cf. FIG. 7) or of the correlation vector V3 (cf. FIG. 8) are separated by a duration substantially equal to $T_S$.

The time position $T_{synchro}$ of the last sample which meets the condition mentioned above is then considered to be the approximate arrival instant of a preamble sequence of the received signal.

According to an enhancement of the invention (not shown in FIGS. 7 and 8), once a correlation is carried out on the whole duration of a sequence S of the received signal, the values of the correlation samples are compared with a threshold and all the correlation values below this threshold are eliminated. An analysis of the time position of the remaining samples (i.e. those above the threshold) is carried out and a new correlation series is carried out during the duration of a sequence. Rough synchronization of the received signal is then acquired when at least two successive samples of the correlation vector V1 (cf. FIG. 7) or of the correlation vector V3 (cf. FIG. 8) are separated by a duration substantially equal to $T_S$. By using a threshold, it is possible to eliminate the majority of the correlation values which do not correspond to the presence of a signal. This threshold has the effect of reducing the false alarm probability (i.e. the probability that the receiver is synchronized while no data frame has been sent). This false alarm probability may also be reduced by the alignment of m maxima, m being an integer larger than 2, the condition being that the duration which separates two successive maxima of the alignment of the m maxima be substantially equal to $T_S$. With this it is thus possible to considerably reduce the probability of synchronization on a secondary maximum of the autocorrelation function of the sequence S. The higher the value of m, the less the receiver is sensitive to the false alarm probability.

The synchronization method of the invention involves an acquisition time larger than or equal to a duration of m sequences for which alignment is sought. The method of the invention is accordingly advantageously compliant with the IEEE 802.15.4a standard which allows the use of a significant number of sequences for synchronization.

Figure 9:
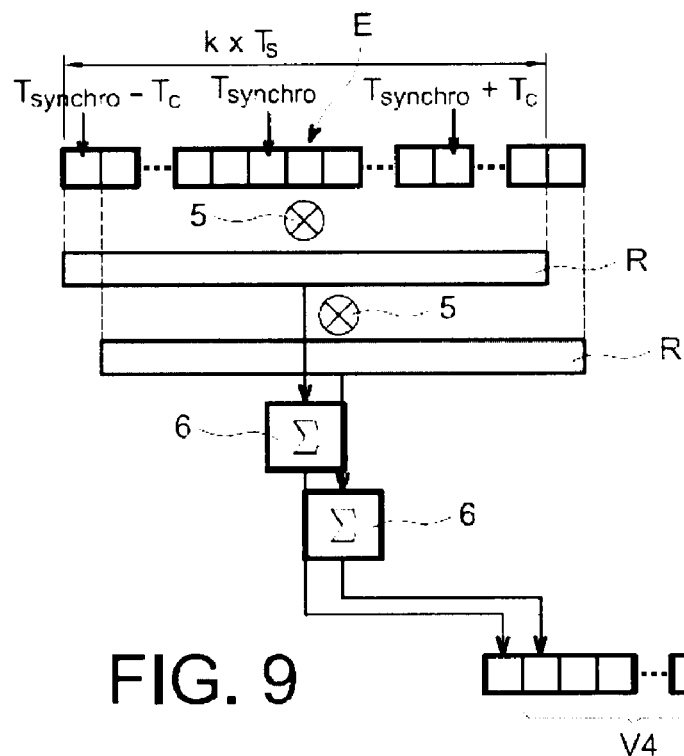
FIG. 9 illustrates, with reference to FIGS. 7 and 8, an additional step of the method of the invention.

Once rough time synchronization is carried out, a fine time synchronization step provides accurate determination of the instant of reception of the sequence, with a time accuracy corresponding to the sampling period ($1/f_E$) of the digitized received signal. The fine time synchronization step is illustrated in FIG. 9. It consists of carrying out a correlation between the digitized received signal and the correlation sequence R in a time interval located around the instant $T_{synchro}$ determined earlier. As approximate synchronization has been carried out previously with a time accuracy equal to $T_c$, the correlation has to be shifted between the instants $T_{synchro}-T_c$ and $T_{synchro}+T_c$. Summation of the correlation samples is carried out after each correlation (adders 6). The sliding correlation then leads to the formation of a correlation vector V4 from the result of the different sums. The instant of arrival of the sequence then corresponds to the time position of the correlation sample of the vector V4 for which correlation is maximum.

In the case when correlation was carried out every $T_C$ seconds for approximate time synchronization (cf. FIG. 7), it is necessary to wait for the reception of a new sequence for accurate synchronization. In the case when the correlation was carried out at the sampling frequency of the digitized signal ($f_E$), fine synchronization may be carried out immediately, from the last received sequence, by using the correlation vector V2 obtained before the sampling which leads to obtaining the vector V3 (cf. FIG. 8). This last solution advantageously allows the use of k sequences S less, but requires a larger number of correlations during the rough synchronization phase, which may involve higher electric consumption.

The value of the synchronization instant $T_{synchro}$ obtained as a result of the approximate synchronization is then refreshed with the instant determined by the fine synchronization step.

In addition to the synchronization of the received signal, the processing method of the invention also relates to an estimation of the propagation channel between the transmitter and the receiver. The propagation channel is modeled by the multiple paths (deferred, attenuated or deformed repetitions) which are due to obstacles encountered by the propagating signal. The estimation of the channel may be carried out either independently of the synchronization steps described above, or after the fine time synchronization phase described above. The estimation of the channel enables accurate determination of the position of the most energetic paths. The channel estimation is used for adapting the binary correlation signal (integration window) to the pulse response of the channel (position of the different paths) and therefore to the specific propagation space configuration encountered between the transmitter and the receiver.

Figure 10:
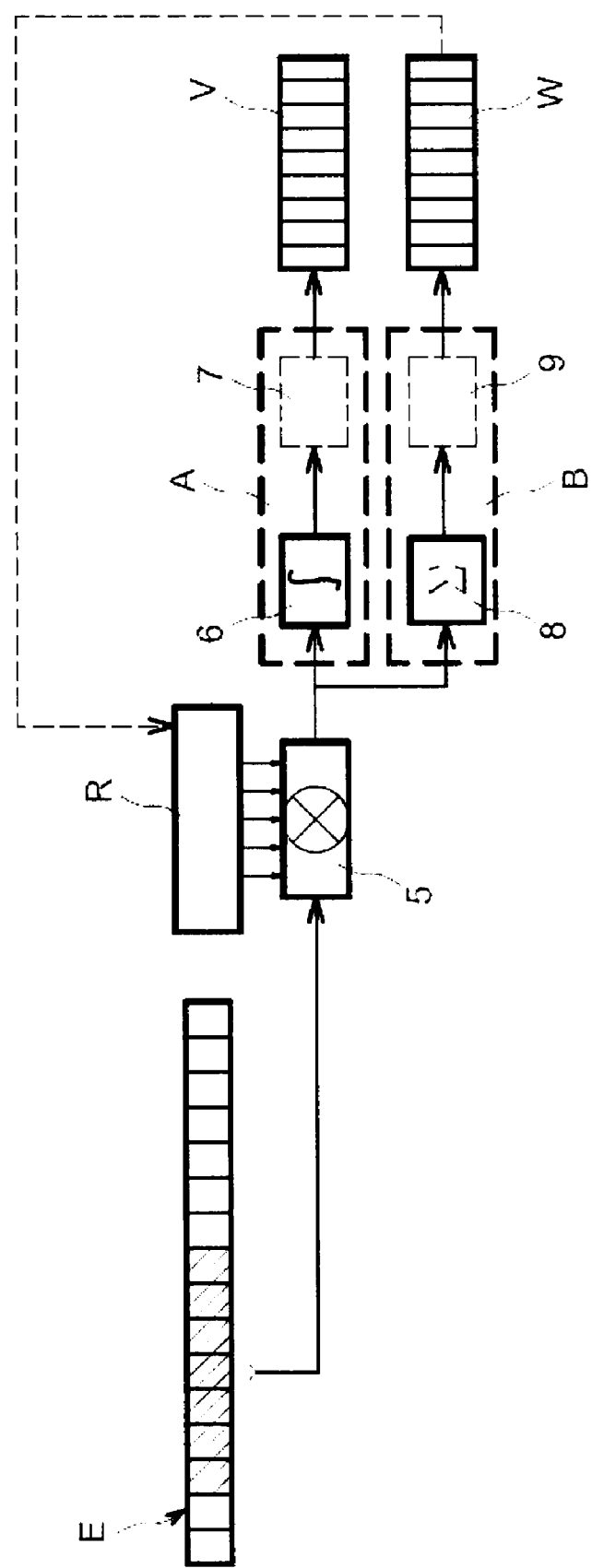
FIGS. 10 and 11 illustrate a third exemplary embodiment of the method of the invention.
Figure 11:
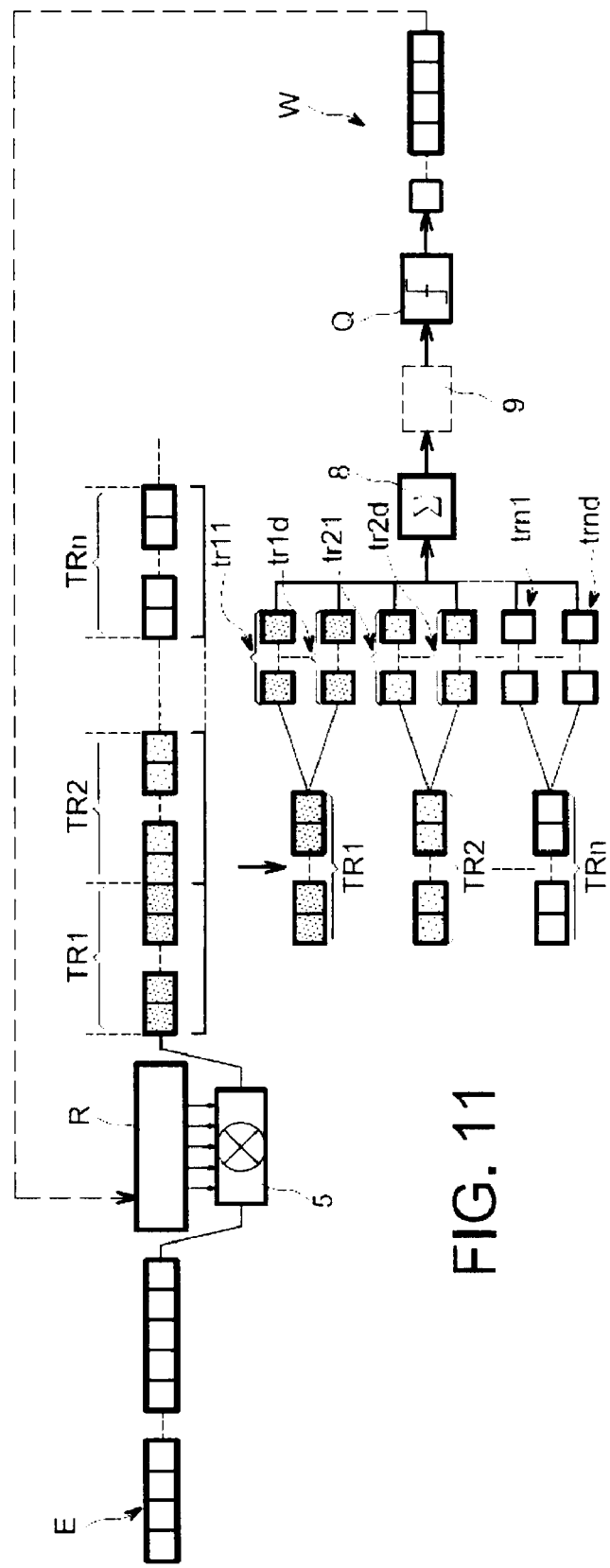

FIGS. 10 and 11 illustrate a channel estimation step according to the invention. FIG. 10 illustrates a block diagram and FIG. 11 illustrates a detailed diagram. In addition to the components already described in FIG. 2, FIG. 10 comprises an adder 8 and, possibly, a device 9 for selecting by threshold which form a processing route B parallel to the processing route A consisting of the components 6 and 7 mentioned earlier.

The correlator 5 carries out here a multiplication between the digitized signal E and the correlation sequence R. The channel estimation may be accomplished on one or more sequences S of the digitized signal E.

For each received sequence S, the digitized signal E is multiplied with a correlation sequence R of duration $T_R$ ($T_R=k \times T_S$, wherein k is an integer larger than or equal to 1) and whereof the spreading duration of each of the data is substantially equal to $1/f_C$.

The product from this multiplication is then cut into a succession of <<sections>> of duration $T_S$, each <<section>> of duration $T_S$ being itself cut into d <<sections>> of duration $T_C$. As this appears as an example in FIG. 11, the signal from the multiplication is then divided into n sections TR1, TR2, . . . , TRn of duration $T_S$ and:

the section TR1 is cut into d <<sections>> tr11, tr12, . . . , tr1d of duration $T_C$,
the section TR2 is cut into d <<sections>> tr21, tr22, . . . , tr2d of duration $T_C$,
the section TRn is cut into d <<sections>> trn1, trn2, . . . , trnd of duration $T_C$, The <<sections>> of duration $T_C$ are then accumulated, sample per sample, in the adder 8 (cf. FIGS. 10 and 11). A threshold may be applied to the result of the accumulations in order to only retain the most energetic parts of the pulse response (cf. the threshold comparison device 9 in FIGS. 10 and 11). Finally, the signal resulting from the application of the threshold is quantified on 1 bit (cf. the quantification operator Q in FIG. 11). The thereby obtained binary signals form a channel estimation vector W of duration $T_C$. The binary signals which make up the channel estimation vector W may then be advantageously re-injected into the correlation sequence R, as a replacement of the areas where the binary signal of the correlation sequence is equal to 1.

According to an enhancement of the invention, channel estimation may be improved by increasing the dynamic range of the channel estimation vector W. For this, several thresholds are set so that it is possible to add weight to the most significant samples. With this technique it is possible to retain the information on the energy contained in each time sample. A time position containing a strong energy value thus has a larger contribution upon demodulation, therefore improving the performances of the receiver in demodulation. The compensation of this technique is increased complexity at the correlator 5, since the correlation sequence R cannot be a sequence of binary data. In order to obtain a weighted channel estimation, it is sufficient to suppress the 1 bit quantification operator Q.

According to another embodiment of the invention, channel estimation is carried out directly by the processing route A. The channel estimation vector is then formed by the correlation vector from the sliding correlation between a sequence S selected from the sampled rectified received signal and a correlation sequence R, whereof the spreading duration of the data is substantially equal to $1/f_E$. As this has been mentioned earlier, the binary signals which make up the channel estimation vector V may then be advantageously re-injected into the correlation sequence R, the spreading duration of which is re-updated beforehand so as to be equal to the duration of the vector V:

1) as a replacement of the areas where the binary signal of the correlation sequence is equal to 1, in the case when the correlation sequence consists of <<1>> and <<0>>, or 2) in the case when the correlation sequence consists of <<1>> and of <<−1>>, as a replacement of the areas where the binary signal of the correlation sequence is non-zero (i.e. equal to 1 or to −1) and this according to the sign of the element of the sequence: the elements of the correlation sequence equal to +1 are replaced with elements of the channel estimation vector V while the elements of the correlation sequence equal to −1 are replaced with the opposite ones, in the arithmetic sense, elements of the channel estimation vector V, i.e. with elements of the vector −V.

Figure 12:
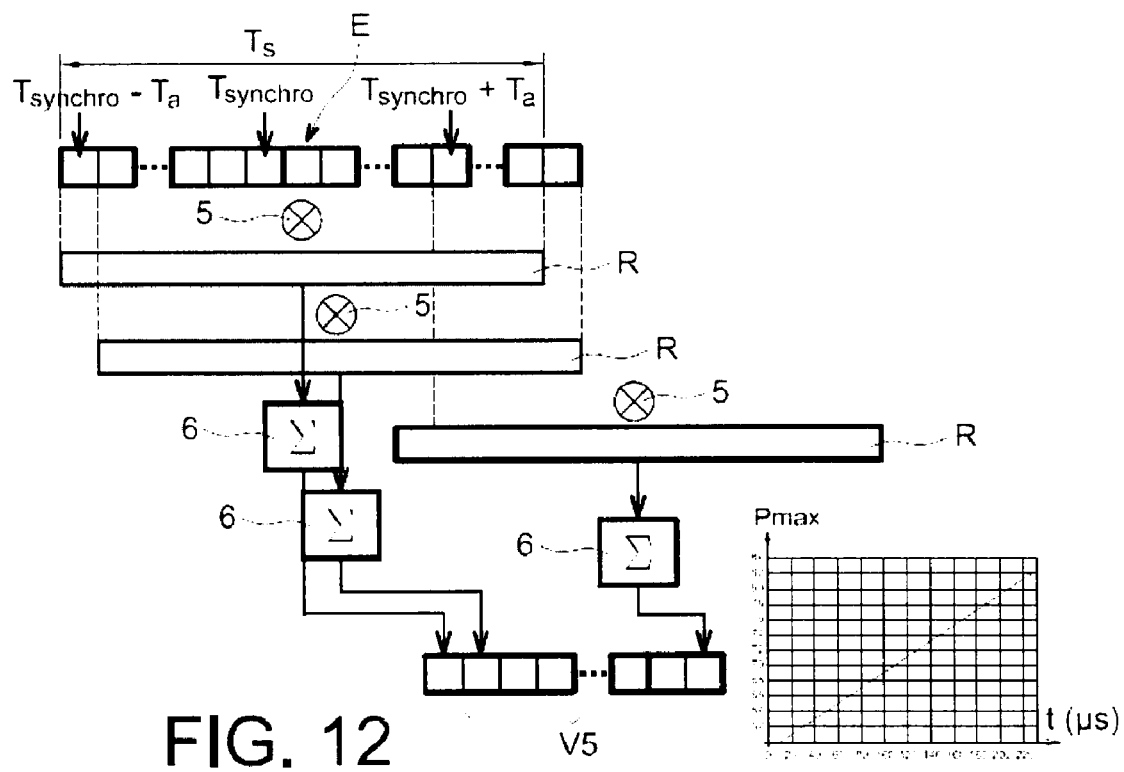
FIG. 12 illustrates a fourth exemplary embodiment of the method of the invention.

The processing method of the invention also relates to a frequency synchronization method for estimating the drift of the clock signals of the receiver. FIG. 12 illustrates the frequency synchronization method of the invention.

The defects related to the drift of the clocks are a significant problem in the ultra-wide band domain. Indeed, the IEEE 802.15.4a standard provides the use of relatively long data frames (of the order of a few milliseconds) associated with relatively weak constraints as for the accuracy of the clocks. It is therefore imperative to be able to estimate these defects and to be able to correct them.

The invention proposes the use of the same base band architecture as the one described earlier for estimating the drift of the clock. Once the arrival instant $T_{synchro}$ of the sequence S is known, a sliding correlation between the digitized received signal and the binary correlation sequence R is carried out, at frequency $f_E$, for each new sequence S, between two instants $T_{synchro}-T_a$ and $T_{synchro}+T_a$ located around the new synchronization instant $T_{synchro}$. The value of $T_a$ is preferentially selected to be larger than or equal to the maximum shift. The binary correlation sequence R may either be modified or not following the channel estimation as described above. The correlation samples of each elementary correlation are summed and a correlation vector V5 is established from the results of the different sums. The position of the correlation maximum is then sought in the correlation vector V5. A comparison of the components of the correlation vector with a threshold (not shown in the figure) may also be carried out before seeking the correlation maximum.

If, for a given sequence S, all the components of the correlation vector do not have a significant value or are below the threshold in the case of comparison to a threshold, then no component of the correlation vector is taken into account for this sequence. Otherwise, a correlation maximum $P_{max}$ of significant value appears. If the clocks are not perfect, the position of this maximum varies from one sequence S to the other. As the drift of the clocks is a constant phenomenon, the position of the correlation maximum varies linearly in time, thereby following a straight line (cf. FIG. 12). The slope of this line then corresponds to an estimation of the drift of the clock. The larger the number of sequences S used for estimating the slope, the more accurate is the estimation of the clock drift.

Figure 13:
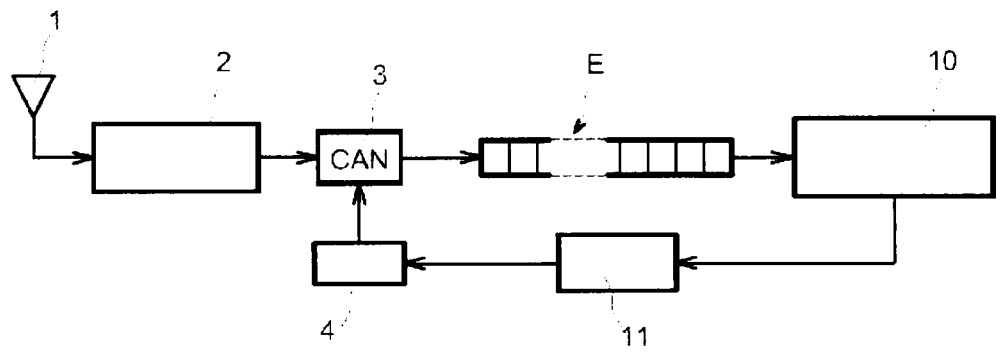
FIG. 13 illustrates an additional step of the method of the invention within the scope of the fourth exemplary embodiment of the method of the invention.

Once it is evaluated, the estimation of the clock shift may be taken into account in two different ways. A first way consists of modifying the operating frequency of the clock from the estimation of the clock drift. FIG. 13 illustrates a non-coherent receiver diagram in which the clock frequency is corrected in this way. In addition to the components shown in FIG. 1, the non-coherent receiver comprises a synchronization and clock drift computation block 10 and a drift correction block 11 which delivers, from a signal delivered by the block 10, a correction signal applied to the clock 4. The clock drift correction block 11 is a block known per se, such as for example a fractional PLL (Phase Locked Loop), the fractional ratio of which is controlled by the estimation of the shift. A second way to take the clock drift into account in a first phase is to store in memory the clock drift estimation, and in a second phase, to use this estimation stored in memory during demodulation, in order to gradually move the window containing the channel estimation so as to gradually shift the correlation in time (cf. the subsequent description relating to the demodulation of the received signal).

FIG. 14 illustrates a processing method of the invention for seeking the start frame delimiter.

The start frame delimiter D located at the end of the preamble (cf. FIG. 3) indicates the arrival instant of the signal containing the transmitted data. It is distinguished from the portion intended for synchronization by the fact that it comprises a succession of coded sequences with a positive, negative or zero coefficient. According to the invention, the detection of the start frame delimiter is advantageously carried out with the same base band architecture as the one described earlier. Its principle is described by means of FIGS. 14 and 15.

During the estimation of the clock drift, the correlation maxima are preserved and a correlation vector consisting of these correlation maxima is formed. When, for a sequence S, the correlation maximum is not significant or does not exceed a threshold, the value of this maximum is either retained or set to 0 (this situation corresponds to the case when the sequence was coded with value 0, therefore no signal has been transmitted during the duration of a sequence).

Figure 15:
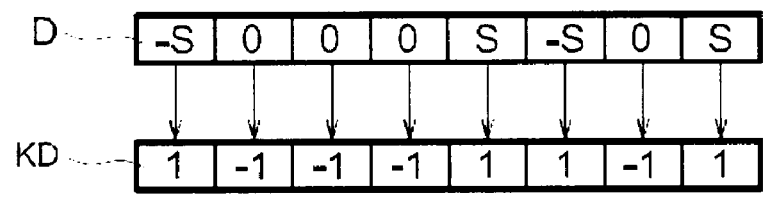
FIG. 15 illustrates an exemplary sequence for delimiting the beginning of a frame and a correlation sequence formed from the sequence for delimiting the start frame used for applying the fifth exemplary embodiment of the method of the invention.

Moreover, a frame start reference sequence KD is formed from the start frame delimiter C (cf. FIG. 15 as an example). The start frame reference sequence KD has a duration equal to the duration of a preamble start frame delimiter duration and consists of binary values defined according to the words which form the data of the start frame delimiter D so that a start frame reference sequence binary value assumes the first value (1) when a word of the start frame delimiter has a non-zero value and a second value (−1) when a word of the start frame delimiter has zero value.

A sliding correlation is then carried out (cf. FIG. 14) between the components of the correlation maxima vector and the start frame reference sequence KD, the sliding correlation consisting of carrying out a succession of n elementary correlation steps, n being an integer larger than or equal to 2, at a frequency 1/Ts, between the components of the correlation maxima vector and the start frame reference sequence. The correlation samples resulting from each elementary correlation step are then summed and the results of the different sums form a start frame delimiter correlation vector V7. A comparison to a threshold may also be carried out here after the summation operations and before forming the start frame delimitation vector.

The start frame delimitation vector components are then compared with a threshold value (12). The start frame delimiter, or instant of arrival of the signal containing the transmitted data, is then determined by the time position of the time component of the start frame delimitation vector which exceeds the threshold (decision operation 13).

Figure 16:
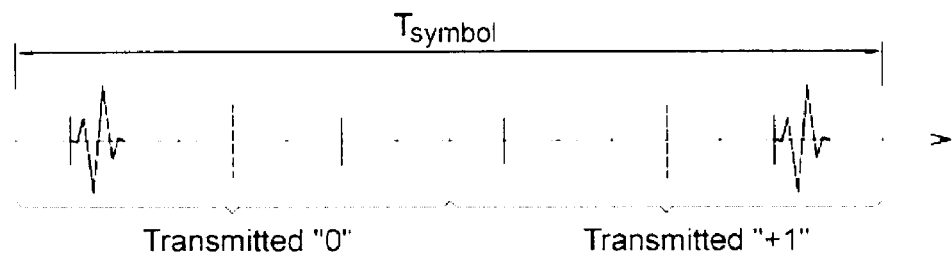
FIG. 16 illustrates an exemplary frame symbol used within the scope of the invention.
Figure 17:
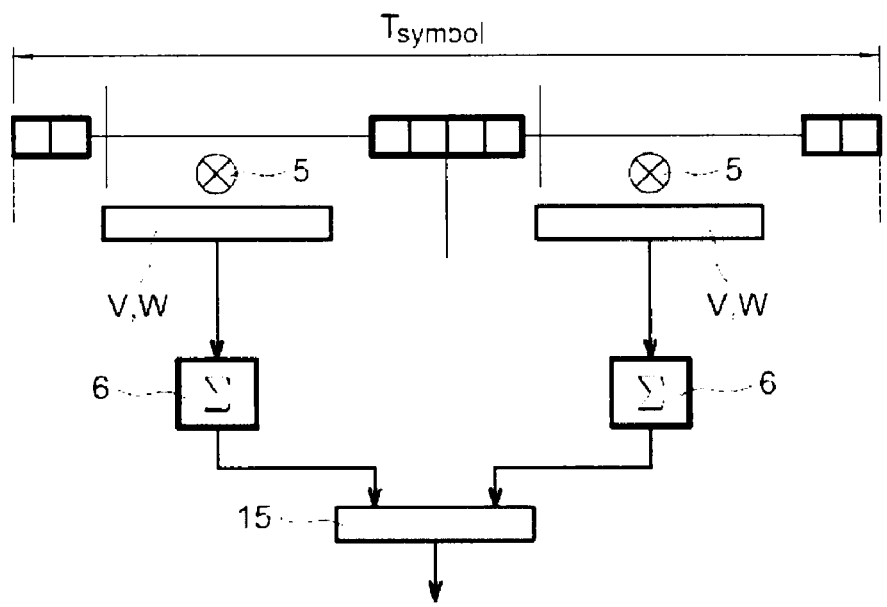
FIG. 17 illustrates a method for demodulating an ultra-wide band received signal within the scope of the invention.

The invention also relates to a method for demodulating these received signals. This demodulation method is illustrated in FIG. 17. The demodulation method of the invention is more particularly adapted to the position-modulation provided by the IEEE 802.15.4a standard (Pulse Position Modulation or PPM) for which a data symbol is represented by its position inside a time period $T_{symbol}$. In a known way per se, a time shift commonly called time hopping, may also be added. FIG. 16 illustrates as a non-limiting example, an exemplary 2-PPM modulation combined with a "time hopping" code of 4 values.

When the signal has been received for a duration $T_{symbol}$ (i.e. a complete symbol has been received), it is divided into N signal sections of duration $T_{symbol}/N$, N being of the order of the pulse position modulation PPM used, the signal contained in each of the N sections being then shifted in order to suppress the time hopping coding. The signal sections are then multiplied (sliding correlation operator 5) by the channel estimation vector W. The results of each multiplication are then summed (operators 6). The N sums are then compared (comparison operator 15). The highest sum gives the position of the pulse and thus the value of the transmitted symbol. The signal portions are selected by taking into account the time hopping code which is known.

Figure 18A:
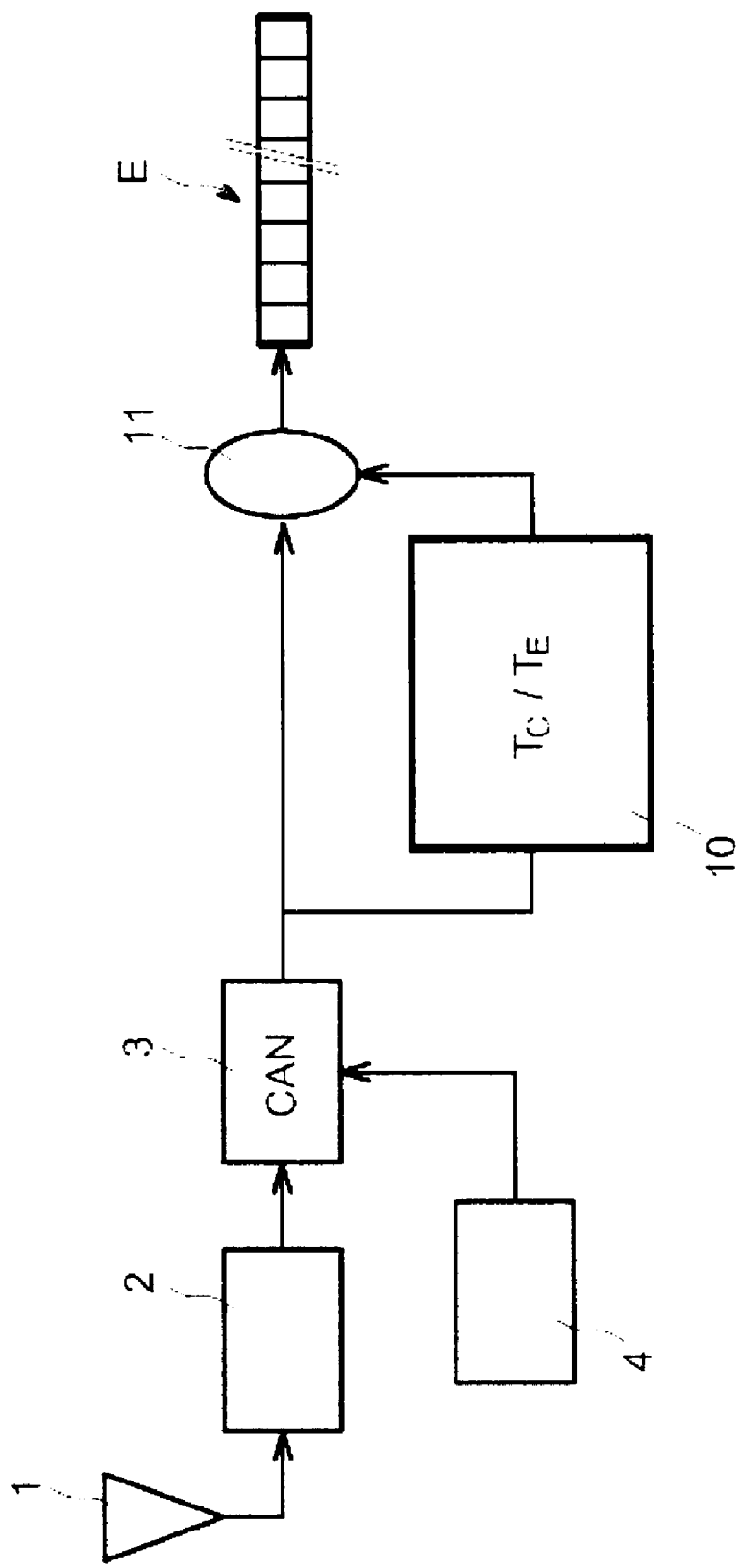
FIGS. 18A-18C illustrate an advantageous modification of the method of the invention.
Figure 18B:
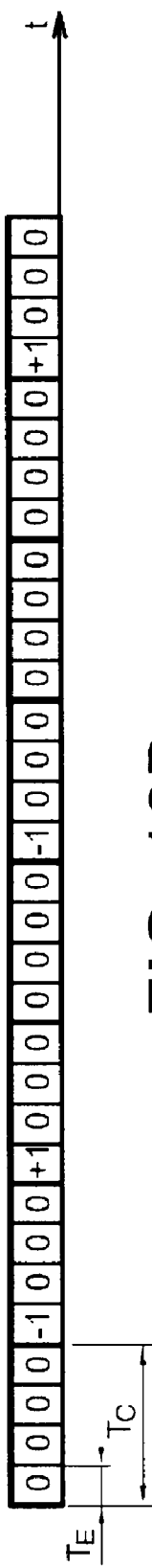
Figure 18C:
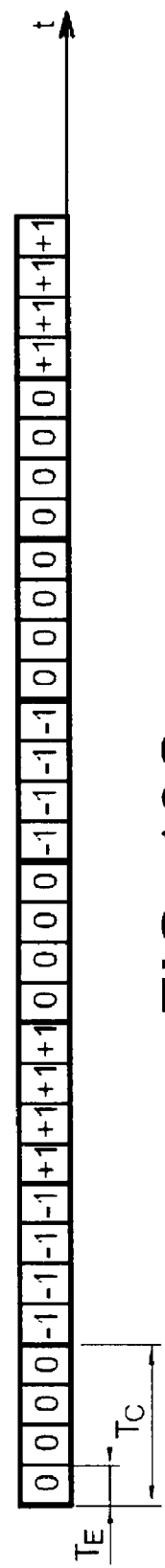

FIGS. 18A-18C illustrate an advantageous modification of the method of the invention. According to this modification, each sample of the sampled rectified signal E is compared at an instant $t_O$, with the sample which corresponds to it at the preceding instant $t_O - T_C$. As this is illustrated in FIG. 18A, in addition to the elements already mentioned with reference to FIG. 1, the receiver of the invention then comprises a delay operator 10 and a comparator 11. The delay operator 11 achieves a delay of $T_C/T_E$ samples. A hard decision is then made on the sign of the differential sample delivered by the comparator 11 in an iterative way on the arriving flow of samples. If the sign of the difference of two samples separated by a duration Tc is negative, the result of the decision is −1, otherwise, the result of the decision is +1. A correlation is then carried out with a specific correlation sequence $R_S$.

The formation of a specific correlation sequence $R_S$ from an exemplary reception binary code of frequency $f_C$ is described below.

A exemplary reception binary code C1 at frequency $f_C$ may be written as:

+1; +1; 0; +1; +1; 0; 0; 0

The binary code C2 obtained by shifting all the data by a duration $T_C$ is then written as:

+1; 0; +1; +1; 0; 0; 0; +1

The differential code C3 from the difference between code C2 and code C1 is written as:

0; −1; +1; 0; −1; 0; 0; +1

The obtained code C3 is a ternary code. FIGS. 18B and 18C illustrate two exemplary correlation sequences formed from code C3. In the example of FIG. 18B, the spreading duration of the data of sequence R is equal to $1/f_E$ and in the example of FIG. 18C, the spreading duration of the data of sequence R is equal to $1/f_C$. An advantage of this modification is to be able to carry out the sliding correlation of a signal with a correlation sequence in a ternary language (+1, −1, 0). This considerably lightens the complexity of the correlator and this makes the estimation of the decision thresholds more robust, which then does not depend on the noise and interference level, unlike the cases of correlation in a high dynamic range.

In the description above, it is mentioned that the spreading duration of the data of a correlation sequence R may vary from $T_C/K$ to $T_C$ ($K=f_E/f_C$). This modulation of the duration of the data which make up a correlation sequence is a low frequency digital filtering, the cut-off frequency of which may vary from $1/T_C$ to $K/T_C$. It should be noted here that the invention relates to other embodiments for which low pass filtering is not achieved at the correlation sequence, but elsewhere at the ultra-wide band receiver. A low pass filtering operation may thus be carried out, for example either on the sampled data of the portion P(E) of the received signal, or on the signals from the correlation operation.

BIBLIOGRAPHIC REFERENCES

[1] FCC, "First report and Order", FCC 02-48, Feb. 14, 2002
[2] M. Z. Win and R. A. Scholtz, "Impulse radio How it works", IEEE Comm. Letters, Vol. 2, no. 2, pp. 36-38, February 1998
[3] "d2P8O2-15-4a Draft Standard", IEEE 802.1 5.4a drafting document
[4] L. Stoica, A. Rabbachin, L. Oppermann, "A Low-Complexity Noncoherent IR-UWB Transceiver Architecture With TOA Estimation", IEEE TRANSACTIONS ON MICROWAVE THEORY AND TECHNIQUES, vol. 54, no. 4, April 2006
[5] Sung-Yoon Jung, Dong-Jo Park, "Design of Preamble Signal for Synchronization with UWB Non-C Energy Detection Receiver", Ultra Wideband 2005 ICU 2005, 2005 IEEE International Conference
[6] A. Rabbachin, L. Oppermann, "Synchronization Analysis for UWB 5 with a Low Complexity Energy Collection Receiver", Ultra Wideband Systems 2004 Joint Conference, Ultra Wideband Systems Technologies Joint UWBST, IWUWBS 2004 International Workshop.

The invention claimed is:

1. A method for processing, in an ultra-wide band receiver, a rectified received signal sampled at a frequency $f_E$, including at least one sliding correlation between a selection of the sampled rectified received signal and a correlation sequence, the correlation sequence including at least one elementary correlation sequence of duration $T_S$ equal to the duration of a sequence S of a transmitted signal which corresponds to the received signal and data which follow each other at a frequency $f_C$ such that $f_C = f_E/k$, k being an integer larger than or equal to 1, an elementary correlation sequence datum corresponding on a one-to-one basis to a datum of a transmission code used for forming the sequence S and having a spreading duration comprised between $1/f_E$ and $1/f_C$, the sliding correlation carrying out a succession of n elementary correlation steps, n being an integer larger than or equal to 2, at a frequency f less than or equal to $f_E$ and greater than or equal to $f_c$, the method comprising, for each selection of the received signal:
   an elementary correlation carrying out a correlation operation between the relevant selection of the sampled rectified ultra-wide band received signal and the correlation sequence to provide a series of intermediate correlation samples; and
   summation of the intermediate correlation samples provided to obtain a single elementary correlation sample; and
   the n elementary correlation samples obtained forming a first correlation vector.

2. The processing method according to claim 1, wherein each of the n correlation samples is compared to a threshold value, so that the first correlation vector is only formed with the correlation samples, the value of which is above the threshold.

3. The processing method according to claim 1, wherein the correlation frequency f being substantially equal to $f_C$, the relative time positions of m successive correlation samples of the correlation vector are analyzed, m being an integer larger than or equal to 2, such that rough synchronization of the sampled rectified ultra-wide band received signal is considered as achieved from the moment that at least two successive correlation samples of the first correlation vector are substantially separated by the duration $T_S$, the time position $T_{synchro}$ of the last of the m correlation samples then being considered as an approximate arrival instant of a sequence S.

4. The processing method according to claim 3, wherein, between instants $T_{synchro}-T_C$ and $T_{synchro}+T_C$, where $T_C=1/f_C$, a second sliding correlation is carried out including carrying out a succession of x second elementary correlation steps, x being an integer larger than or equal to 2, at a correlation frequency substantially equal to $f_E$, between a sequence S subsequent to the sequence S having being used for determining the time position $T_{synchro}$ and a correlation sequence, the data of which have a spreading duration substantially equal to $1/f_E$, a second elementary correlation step producing a series of second intermediate correlation samples, and further comprising:
summing the second intermediate correlation samples delivered by each of the x second elementary correlation steps to form y second correlation samples;
forming a second correlation vector built from each of the y second successive correlation samples, the time position of the correlation sample of the second correlation vector for which the correlation sample has maximum value, being considered as an accurate instant of arrival of a sequence S; and
refreshing the time position $T_{synchro}$ on the basis of the time position considered as the accurate instant of arrival of the sequence S.

5. The processing method according to claim 1, wherein the correlation frequency f being substantially equal to $f_E$:
the first correlation vector is sampled at frequency $f_C$ so as to obtain a sampled correlation vector; and
the relative time positions of m successive correlation samples of the sampled correlation vector are analyzed, m being an integer larger than or equal to 2, so that rough synchronization is considered as carried out from the moment that at least two successive correlation samples of the sampled correlation vector are substantially separated by the duration $T_S$, the time position $T_{synchro}$ of the last of the m correlation samples then being considered as an approximate instant of arrival of a sequence S.

6. The processing method according to claim 5, wherein a search for the maximum of the first correlation vector is carried out between instants $T_{srchro}-T_C$ and $T_{synchro}+T_C$, where $T_C=1/f_C$, the time position of the correlation sample of the first correlation vector for which the correlation sample has a maximum value being considered as an accurate instant of arrival of a sequence S, refreshing of the time position $T_{synchro}$ being then carried out on the basis of the time position considered as the accurate instant of arrival of a sequence S.

7. The processing method according to claim 3, wherein the spreading duration of the elementary correlation sequence data is substantially equal to $1/f_C$.

8. The processing method according to claim 4, when the time position $T_{synchro}$ has been refreshed, upon arrival of each new sequence S, between an instant $T_{synchro}-T_a$ and an instant $T_{synchro}+T_a$, and further comprising:
an additional sliding correlation, at a frequency f substantially equal to $f_E$, between the rectified received signal sampled at frequency $f_E$ and a correlation sequence, the elementary correlation sequence data of which have a spreading duration substantially equal to $1/f_E$, to obtain additional elementary correlation samples for each sequence S;
summation, for each sequence S, of the additional elementary correlation samples to form additional correlation samples which form a third correlation vector;
a search for the time position of the correlation maximum for each third correlation vector; and
an analysis of the position of the correlation maximum in each third correlation vector so that, if the correlation maximum is substantially located at the same position in each third correlation vector, it is considered that a clock signal which controls the sampling of the received ultra-wide band signal is not drifting or, otherwise it is considered that said clock signal is drifting.

9. The processing method according to claim 8, wherein each of the second correlation samples is compared with a threshold value, so that the third correlation vector is only formed with the second correlation samples, for which the value is above the threshold.

10. The processing method according to claim 8, wherein when it is considered that the clock signal is drifting, a correction of the clock signal is carried out on the basis of the slope of a straight line which represents the variation over time of the correlation maximum.

11. The processing method according to claim 1, further comprising:
forming a correlation maxima vector from the correlation maxima of each third correlation vector;
a sliding correlation between the components of the correlation maxima vector and a start frame reference sequence, the sliding correlation including carrying out a succession of n start frame elementary correlation steps, n being an integer larger than or equal to 2, at a frequency $1/T_S$, between the components of the correlation maxima vector and the start frame reference sequence, the start frame reference sequence having a duration equal to the duration of a start frame delimitation sequence and including binary values defined according to the words which form the data of the start frame delimitation sequence so that a binary value of the start frame reference sequence assumes a first value when a word of the start frame delimitation sequence has a non-zero value and a second value when a word of the start frame delimitation sequence has a zero value;
summation of the samples from each start frame elementary correlation operation to deliver a succession of start frame elementary sums;
selecting by threshold start frame elementary sums to select the start frame elementary sums for which the value is above a threshold; and
determining the start frame instant, by the time position of the start frame elementary sum, the value of which exceeds the threshold.

12. The method according to claim 1, wherein, upon arrival of each sequence S, the sliding correlation is a correlation between the sequence S and the correlation sequence to obtain elementary correlation samples relating to each sequence S, and further comprising:
summation, for each sequence S, of the elementary correlation samples to form second correlation samples which form a second correlation vector;
seeking the time position of the correlation maximum for each second correlation vector; and
analyzing the position of the correlation maximum in each second correlation vector so that, if the correlation maximum is substantially located at the same position in each second correlation vector, it is considered that a clock signal which controls the sampling of the received ultra-wide band signal is not drifting or, otherwise, it is considered that said clock signal is drifting.

13. The processing method according to claim 12, wherein each of the second correlation samples is compared with a threshold value, so that the second correlation vector is only formed by the second correlation samples, the value of which is above the threshold.

14. The processing method according to claim 12, wherein, when it is considered that the clock signal is drifting, a correction of the clock signal is carried out on the basis of the slope of a straight line which represents the variation over time of the correlation maximum.

15. The processing method according to claim 1, further comprising:
    forming a correlation maxima vector from correlation maxima of each correlation vector;
    a sliding correlation between the components of the correlation maxima vector and a start frame reference sequence, the sliding correlation including carrying out a succession of n start frame elementary correlation steps, n being an integer larger than or equal to 2, at a frequency 1/Ts, between the components of the correlation maxima vector and the start frame reference sequence, the start frame reference sequence having a duration equal to the duration of a start frame delimitation sequence and including binary values defined according to the words which make up the data of the start frame delimitation sequence so that a start frame reference sequence binary value assumes a first value when a word of the start frame delimitation sequence has a non-zero value and a second value when a word of the start frame delimitation sequence has a zero value;
    summation of the samples from each start frame elementary correlation operation to deliver a succession of start frame elementary sums;
    selecting by threshold start frame elementary sums to select the start frame elementary sums, the value of which is above a threshold; and
    determining the start frame instant, by the time position of the start frame elementary sum, the value of which exceeds the threshold.

16. The processing method according to claim 1, wherein the sliding correlation comprises:
    multiplication between a sequence S selected from the sampled rectified received signal and a correlation sequence whereof the spreading duration of the data is substantially equal to 1/fC;
    cutting the signal from the multiplication into signal portions of duration TC;
    summation, sample per sample, of the signal portions or duration TC;
    selecting by threshold the result of the sum of the signal portions of duration TC to only retain the result of the sum of the signal portions of duration TC if the latter is above the threshold;
    quantification on a bit of the signal from the selection by threshold of the result of the sum of the signal portions of duration TC; and
    forming a channel estimation vector from signals resulting from the quantification.

17. The processing method according to claim 1, wherein the sliding correlation is a sliding correlation between a sequence S selected from the sampled rectified received signal and a correlation sequence, whereof the spreading duration of the data is substantially equal to $1/f_E$, the first correlation vector forming a channel estimation vector.

18. The processing method according to claim 16, wherein the signal data which form the channel estimation vector are used for modifying the data which form the correlation sequence.

19. The processing method according to claim 16, wherein the received sampled ultra-wide band signal for a duration equal to a duration of a frame symbol is divided into N sections of signal samples, each of which is correlated with the channel estimation vector so as to deliver N symbol correlation sample sets, the samples of each of the N symbol correlation sample sets being summed in order to form N sums of symbol samples, the N symbol sample sums being then compared with each other, the sum for which the value is the highest giving the time position of a pulse in the duration of the symbol and accordingly the value of the transmitted symbol.

20. The processing method according to claim 1, wherein a correlation sequence is a binary correlation sequence, the values of which assume the values +1 or 0, the value +1 being associated with a value +1 or −1 of a transmission ternary code on the basis of which a transmission sequence S is formed and the value 0 being associated with a value 0 of the transmission ternary code.

21. The processing method according to claim 1, wherein a correlation sequence is a binary correlation sequence, the data of which assume values +1 or −1, the value +1 being associated with a value +1 or −1 of a transmission ternary code on the basis of which a transmission sequence S is formed and the value −1 being associated with a value 0 of the transmission ternary code.

22. The processing method according to claim 1, wherein:
    a correlation sequence is a ternary correlation sequence, the values of which assume values +1, 0 or −1 and are formed from the difference between a first binary correlation sequence and a second binary correlation sequence, the first binary correlation sequence consisting of data, the values of which assume at an instant $t_o$, values +1 or 0, the value +1 being associated with a value +1 or −1 of a transmission ternary code on the basis of which is formed a transmission sequence S and the value 0 being associated with a value 0 of the transmission ternary code, and the second binary correlation sequence consisting of data, the values of which are at instant to, the values of the data which form the first binary correlation sequence at the instant $t_o-1/f_C$; and
    selection of the sampled rectified received signal is formed from the difference between a first fraction of the sampled rectified received signal taken at instant $t_1$ and a second fraction of the sampled rectified received signal taken at an instant $t_1-1/f_C$.

* * * * *